United States Patent
Bonnet et al.

(10) Patent No.: US 7,494,740 B2
(45) Date of Patent: Feb. 24, 2009

(54) MICROCOMPOSITE POWDER BASED ON FLAT GRAPHITE PARTICLES AND ON A FLUOROPOLYMER AND OBJECTS MADE FROM SAME

(75) Inventors: Anthony Bonnet, Beaumont le Roger (FR); Jean-Felix Salas, Montbazon (FR)

(73) Assignee: Commissariat a l'Energie Atomique, Paris (FR)

( * ) Notice: Subject to any disclaimer, the term of this patent is extended or adjusted under 35 U.S.C. 154(b) by 997 days.

(21) Appl. No.: 10/499,847

(22) PCT Filed: Dec. 27, 2002

(86) PCT No.: PCT/FR02/04569

§ 371 (c)(1), (2), (4) Date: Aug. 24, 2004

(87) PCT Pub. No.: WO03/067686

PCT Pub. Date: Aug. 14, 2003

(65) Prior Publication Data

US 2004/0262584 A1 Dec. 30, 2004

(30) Foreign Application Priority Data

Jan. 14, 2002 (FR) .................... 02 00374

(51) Int. Cl.
*H01M 4/00* (2006.01)
(52) U.S. Cl. .............. 429/42; 429/34; 429/39; 428/407; 252/511
(58) Field of Classification Search .......... 429/42, 429/34, 39; 428/407; 252/511
See application file for complete search history.

(56) References Cited

U.S. PATENT DOCUMENTS

| 4,163,811 A | 8/1979 | Kohlmayr et al. |
| 4,177,159 A | 12/1979 | Singer |
| 4,214,969 A | 7/1980 | Lawrance |
| 4,339,322 A | 7/1982 | Balko et al. |
| 5,268,239 A | 12/1993 | Roche |
| 5,804,116 A | 9/1998 | Schmid et al. |

| 2002/0136941 A1* | 9/2002 | Bonnet et al. .............. 429/34 |
| 2004/0053050 A1 | 3/2004 | Guerfi et al. |

FOREIGN PATENT DOCUMENTS

| DE | 35 38 732 A1 | 6/1986 |
| EP | 0 459 157 A2 | 12/1991 |
| EP | 0 557 259 A1 | 8/1993 |
| EP | 0 774 337 A1 | 5/1997 |
| EP | 0 928 036 A1 | 7/1999 |
| EP | 0 933 825 A2 | 8/1999 |
| EP | 0 935 303 A1 | 8/1999 |
| EP | 0 948 071 A2 | 10/1999 |
| FR | 2 355 381 | 1/1978 |
| FR | 2 430 100 | 1/1980 |
| GB | 2 220 666 A | 1/1990 |
| JP | 52-122276 | 10/1977 |
| JP | 4-13287 | 1/1992 |
| JP | 8-31231 | 2/1996 |
| WO | 96/12309 | 4/1996 |
| WO | 98/53514 | 11/1998 |
| WO | 00/24075 | 4/2000 |
| WO | 00/25372 | 5/2000 |
| WO | 00/30202 | 5/2000 |
| WO | 02/34670 A1 | 5/2002 |

OTHER PUBLICATIONS

K. Zaghib, et al., Journal of the Electrochemical Society, vol. 147, No. 6, pp. 2110-2115 (2000).
D. Aurbach, et al., Journal of Applied Electrochemistry, vol. 28, pp. 1051-1059 (1998).
M. Ushida, et al., Journal of the Electrochemical Society, vol. 142, No. 12, pp. 4143-4148 (1995) English abstract only.
A. Fischer, et al., Journal of Applied Electrochemistry, vol. 28, pp. 277-282 (1998) English abstract only.

* cited by examiner

*Primary Examiner*—Patrick Ryan
*Assistant Examiner*—Ben Lewis
(74) *Attorney, Agent, or Firm*—Oblon, Spivak, McClelland, Maier & Neustadt, P.C.

(57) ABSTRACT

The present invention concerns a microcomposite powder comprising: flat graphite particles $G_{LP}$ having sides from 50 to 1000 μm and a thickness from 5 to 50 μm, consisting of agglomerates of more elementary graphite particles joined together and superimposed so that their principal planes are mutually parallel, said particles being covered with particles of a fluoropolymer from 0.1 to 0.5 μm in size.

12 Claims, No Drawings

MICROCOMPOSITE POWDER BASED ON FLAT GRAPHITE PARTICLES AND ON A FLUOROPOLYMER AND OBJECTS MADE FROM SAME

This application claims benefit, under U.S.C. §119 or §365 of French Application Number 02/00374, filed Jan. 14, 2002; and PCT/FR02/04569 filed Dec. 27, 2002.

FIELD OF THE INVENTION

The present invention relates to a microcomposite powder based on graphite flakes and on a fluoropolymer, and to the objects manufactured with this powder. More specifically, the microcomposite powder consists of particles about 0.1 µm to 0.5 µm in size of a fluoropolymer, advantageously PVDF, which are attached to graphite flakes. This powder can be obtained by coatomization.

The invention is particularly useful for producing bipolar plates used in fuel cells. Fuel cells consisting of these bipolar plates are exposed to severe conditions of use in terms of pressure, temperature and chemical and electrochemical attack. These bipolar plates must therefore be able to withstand these various conditions and be able to be easily handled during assembly of the fuel cell. There are several types of operation of fuel cells, which generate different specifications with regard to the characteristics that the bipolar plates must have in terms of conductivity, mechanical strength and permeability.

BACKGROUND OF THE INVENTION

Electrically conductive composites consist of conductive particles dispersed in an organic matrix. The conduction threshold, or percolation threshold (a transition between insulator and conductor), is reached when the conductive particles form a network of connected conducting pathways over the entire volume of the composite.

The conductive particles may be metallic particles, which have the advantage of a high electrical conductivity. However, they have the drawback of possessing a high density and of being sensitive to the chemical environment of the cell. Non-metallic particles are particularly useful because of their low density and their chemical resistance. The non-metallic conductive fillers used most often are carbon-based pulverulent products, such as graphite or carbon black powders and carbon fibres.

Depending on the particle morphology (aspect ratio and specific surface area), the percolation threshold is reached for filler fractions of a few vol % in the case of fibres and from 20 to 30 vol % in the case of spheres. Typically, these fillers can be used to obtain conductivities within the volume of the material of the order of $10^{-5}$ to $10^{-1}$ S/cm. Thus, it should be pointed out that the conductivity of the composites is very much lower than that of the fillers used (of the order of 1000 S/cm in the case of graphite), although the filler fractions are above the percolation threshold. This effect is explained by the large contact resistances between adjacent particles. These resistances are due, on the one hand, to the low contact surface area between two particles (constriction resistance) and, on the other hand, to the formation of an insulating film on the surface of the fillers when they are dispersed in the organic binder (tunnel resistance).

The constriction resistance is defined by the equation $R_{cr}=r_f/d$, where $r_f$ represents the resistivity of the filler and d the diameter of the interparticle contact surface. The coverage area of the fillers is controlled by their geometry and their viscoelastic properties, that is to say their ability to deform under stress.

The tunnel resistance is associated with any insulating film able to cover the surface of the particles. It may be due to absorbed surfactants or more simply to the organic matrix which encapsulates the fillers once they have been dispersed therein. In this configuration, the mechanism of conduction between conductive particles is no longer ohmic, but takes place via electron jumps between isolated particles. Because of the low electron transport properties of polymers, the local electric field between conductive particles, which is necessary for the electric current to be able to flow through the entire conductive clusters formed by the fillers, must be very high. In practice, the local electric field is never high enough to allow an electron to jump between each particle which is connected but insulated by a polymer film. Only a small portion of the conducting pathways is stressed and actually participates in the flow of the current. The macroscopic conductivity is greatly reduced. The tunnel resistance is defined by the equation $R_t=r_t/a$, where $r_t$ represents the tunnel resistivity, which depends on the thickness of the film and on the electrical properties of the insulating organic matrix, and where a is the contact area.

The resistance at the particle—particle interface is the sum of the constriction and tunnel resistances. In the great majority of cases, the tunnel resistance governs the macroscopic conductivity of heterogeneous media. This is because the tunnel resistance goes from $10^{-8}$ to $10^3$ $\square$·cm when the thickness of the insulating film covering the contacting conductive particles varies from 0.5 to 12 nm. This insulation thickness of a few nanometres conventionally corresponds to the layer of polymer matrix adsorbed on the surface of the fillers during dispersion.

The abovementioned general principles suggest that to produce highly conductive composites requires the processing, by conventional polymer conversion techniques, of materials which are highly filled with conductive elements so as, on the one hand, to increase the number of contacts between conductive particles and, on the other hand, to increase the contact areas between adjacent elements.

These principles, used within the context of developing elements for a fuel cell, have resulted in the following most significant patents being filed:

U.S. Pat. No. 6,106,263 claims a process for producing moulded bodies by extruding plastics filled to more than 50 vol % (preferably 65 to 90 vol %) with conductive elements (lamellar or non-lamellar graphite, conductive fibres, etc). In this case, mixing is carried out in a mixer and then the mixture, after having been crushed and ground, is extruded in the form of sheet or tube. The patent describes the processing operations and the specific and inventive operation of the extruder used. The formulations are produced from any type of commercially available conductive fillers.

Patent applications have been filed for processes consisting in thermally compressing mixtures of graphite (lamellar or non-lamellar) powder in thermoplastics. The main points claimed are the production of sufficiently conductive mouldable materials.

U.S. Pat. No. 5,558,955 claims the production of a stack for a DMFC fuel cell, based on a conductive composite obtained by a thermally compressed mixture of lamellar graphite and a fluororesin (PTFE). The materials produced by this process are non-porous and directly compression-mouldable. The structure of the conductive material and the nature of the fillers are not necessarily optimized for controlling the gas impermeability and the cooling of the cell (deposition of a surface barrier material in order to seal the assembly).

Application US 2002004156 discloses a process for manufacturing separator plates for a fuel cell, based on a thermosetting binder (phenolic/epoxy resin) filled with graphite (lamellar or non-lamellar). The mixture is thermally compressed in a mould to the geometry of the separator plates to be produced. The porosity, and therefore to a first approximation the gas impermeability, is optimized by promoting the removal of the water and gases formed during crosslinking. However, an insulating resin layer covers the surface of the plates and must be removed by stripping.

U.S. Pat. No. 5,942,347 discloses a process for manufacturing, by thermal compression, bipolar separator plates containing from 50 to 95% of conductive filler in various thermoplastics. The problem of gas impermeability is circumvented by the addition of a hydrophilic agent promoting the migration of water in the pores of the material. This configuration promotes above all the removal of the water produced in the cell and allows the cell to be cooled.

U.S. Pat. No. 6,436,567 discloses a process for manufacturing separator plates for fuel cells, having a high conductivity, a low gas permeability and high mechanical properties. The bipolar plate material consists of a compound based on a polymer and on graphite powder, the aspect ratio of which is from 4 to 60 (preferably 10 to 30). This filler morphology allows the gas impermeability and the electrical conductivity to be improved. However, the structure of the filler is not described.

The prior art in the field of electrically conductive filled materials for bipolar plates has therefore essentially described materials based on graphite, the morphology and the structure of which are not clearly explained.

Moreover, in the field of materials for bipolar plates based on polyvinylidene fluoride (PVDF) or more generally on fluoropolymers, the following patent applications shall be mentioned:

Patent DE 353 8732 discloses an electrode made from a paste which may possibly be extended and consists of 70 to 80% by weight of carbon powder having a granule size of 30 to 300 μm and of 10 to 20% by weight of a PVDF solution containing 4 to 8% PVDF in DMF (dimethylformamide) and of at least 5% by weight of PTFE (polytetrafluoroethylene) powder having a granule size of 10 to 100 μm. The paste is spread out over an aluminium substrate and then dried using an infrared lamp for ½ h to 4 h. This electrode based on PVDF and carbon is permeable to gases and to liquids.

Patent Application JP 08031231 A discloses a formulation based on spherical graphite, on a thermoset or thermoplastic and on carbon black of the conducive Ketjenblack type. The material shows good mechanical strength and can be used for moulding and calendering. This material can be used in the fuel cell field.

Patent Application JP 04013287 A discloses a carbon plate which is porous in three dimensions with a porosity level of 60% to 80%.

Patent Application JP 52122276 A discloses an electrode prepared by depositing pyrolysed anisotropic carbon onto a porous textile, the carbon itself being coated with an aqueous dispersion of TEFLON® (PTFE), and the whole assembly is dried to form a hydrophobic porous layer.

U.S. Pat. No. 6,248,467 discloses a bipolar plate for use in the fuel cell field, which is obtained by moulding a vinyl ester resin and a graphite powder, allowing a conductivity of at least 10 S/cm to be obtained. These plates may contain from 20% to 95% graphite and from 0% to 5% carbon black, together with cotton fibres. The use of fluoro products to improve the demoulding and the hydrophobicity are also disclosed therein.

U.S. Pat. No. 5,268,239 discloses the preparation of a separator plate. This graphite-based plate is a mixture containing from 25 to 75% by weight of graphite and from 25 to 75% by weight of phenolic resin. Next, this plate is pyrolysed between 800 and 1 000° C. and then graphitized between 2 300° C. and 3 000° C. This patent also describes the application of a fluoropolymer film in order to prevent migration of the electrolyte.

Patent Application WO 2000/24075 discloses the preparation of a substrate that can be used for membrane preparation, this substrate comprising a porous fibre matrix, characterized in that the fibres are adhesively bonded to the silica and a fluoropolymer. It also describes the process, with firstly the dispersion of the fibres in water and then secondly the deposition of this dispersion in order to form a network. The network of fibres is then dried and compacted. An aqueous fluoropolymer dispersion can be introduced before or after this drying and compacting step.

U.S. Pat. No. 4,163,811 discloses a process for preparing an electrode for fuel cells, characterized by the following steps: (i) firstly, the formation of an aqueous suspension of catalyst particles, with addition of a cationic surfactant, then (ii) the formation of a second colloidal aqueous suspension of a hydrophobic polymer and (iii) the mixing of the two suspensions in order to form a uniform aqueous suspension of catalyst particles and hydrophobic polymer particles. This suspension is then deposited on a conductive support and heated so as to sinter the layer of catalyst and polymer.

U.S. Pat. No. 4,177,159 discloses a process for preparing a dry finely divided powder characterized in that it consists of particles having a maximum size of approximately 5 μm. This powder comprises precatalysed carbon and a hydrophobic fluorocarbon polymer, for example PTFE. This powder is obtained by flocculating a cosuspension of the precatalysed carbon particles and the polymer particles.

U.S. Pat. No. 6,455,109 and US 2003096154 discloses a method for producing an electrode for fuel cells and a catalytic powder prepared by mixing a fine carbon powder supporting a catalytic metal with a colloidal dispersion of a polymer. The suspension thus obtained is dried.

U.S. Pat. No. 5,846,670 discloses the preparation of a gas diffusion electrode for an electrochemical cell. This electrode is prepared using a carbon black powder dispersed in an organic solvent in the presence of soluble polyethylene. The dispersion is then dried, allowing the polyethylene to cover the surface of the black. This polyethylene is then fluorinated. Next, this hydrophobic carbon black powder is mixed with an acetylene carbon black supporting a catalyst metal and PTFE in order to form aggregates. Next, these aggregates are pressed at 20 kg/cm$^2$ and sintered at 340° C. for 20 minutes.

U.S. Pat. No. 6,103,077, U.S. Pat. No. 6,368,476, and U.S. Pat. No. 6,444,601 describe a method of preparing a gas-permeable electrode by making a dispersion of carbon black particles or of carbon black particles supporting a catalyst using a high-shear apparatus in order to homogenize it, such as a microfluidizer, then by adding a binder to the dispersion obtained followed by a stabilizer. Next, this mixture is deposited on an electrically conducting fabric and then dried and sintered at 300-400° C.

U.S. Pat. No. 6,180,275 discloses a mouldable composition used for preparing current collector plates by compression moulding or injection moulding. This composition comprises a non-fluorinated polymer binder; the polymers that can be used include polyphenylene sulphides, modified polyphenylene ethers, liquid-crystal polymers, polyamides, polyimides, polyesters, phenolic resins, epoxy resins and vinyl esters. The conducting particles include more particularly carbon particles. These carbon particles are present in an amount of at least 45% by weight.

Makoto Ushida, in J. Electrochem. Soc., Vol. 142, No. 12, December 1995, studied the preparation of an MEA (membrane and electrode assembly), based on the formation of a colloid for optimizing the formation of a network in the layer of catalyst and for simplifying the manufacture of the MEA. The preparation, by producing, for example, a mixture of perfluorosulfonate ionomer (PFSI) dissolved in ethanol, receives an addition of butyl acetate (a poor solvent) in order to form a colloidal solution. Next, a platinum-supporting carbon is mixed with a carbon coated with PTFE. This PTFE-coated carbon is prepared by mixing a carbon suspension and a PTFE suspension together with a surfactant, and the surfactant is then removed during a treatment in air at 290° C. The mixture of the two powders, Pt/C and C/PTFE, is added to the PFSI colloidal solution, which gives rise to crosslinking of the PFSI chains adsorbed by the carbon, this crosslinking being promoted by an ultrasonic treatment. This colloidal suspension is then spread out onto a carbon paper which is pressed at 130° C. and 7.5 MPa for 1 minute.

In Journal of applied electro chemistry 28 (1998) pp 277-282 Fischer studied the preparation of an MEA by spraying a mixture of a slurry (suspension) of a catalyst metal, of a Nafion® (fluoroacrylate) solution in water and of glycerol onto a heated membrane based on Nafion 117®. The solvents are then evaporated by heating to 150°C.

U.S. Pat. No. 4,214,969 discloses a bipolar plate for fuel cells, which consists of graphite and a fluoropolymer in a ratio of 2.5:1 to 16:1. These bipolar plates have a volume resistivity of $4 \times 10^{-3}$ Ω·in. This graphite/fluoropolymer mixture is dry-blended in a blender for 25 minutes and then introduced into a hot compression mould.

Patent Application GB 22 20666 discloses a cospraying method for preparing carbon black particles coated very uniformly with synthetic latex particles. There is no mention of a fluoropolymer in the description or in the examples.

The prior art has essentially disclosed the production of bipolar plates by batch processes using solvents or processes involving only coarse mixtures of the various products used to produce the plates. The prior art disclosing coatomization does not disclose fluoropolymers. Nor does the literature describe graphite having a morphology allowing the direct production, by moulding, of composite plates having a high impermeability, a high surface conductivity and a high thermal conductivity.

The Applicant has now found a highly homogeneous microcomposite powder based on a fluoropolymer and on graphite flakes having a morphology consisting of superimposed parallel graphite lamellae having a high interparticle contact area. This powder can be processed by the techniques normally used for thermoplastics and makes it possible to obtain, directly after moulding, bipolar plates having a high surface conductivity. The gas impermeability levels depend on the conditions under which the plate is processed. This microcomposite powder may be produced by coatomizing an aqueous dispersion comprising a fluoropolymer and these graphite flakes.

The process for manufacturing the microcomposite powder does not involve any solvent other than water. The objects thus manufactured are useful in fuel cells.

The advantages and further features of the present invention will be explained in the detailed description of the invention which follows.

SUMMARY OF THE INVENTION

The present invention relates to a microcomposite powder comprising:
graphite flakes $G_{LP}$ having sides from 50 to 1000 µm and a thickness from 5 to 50 µm, consisting of agglomerates of more elementary graphite particles joined together and superimposed so that their principal planes are mutually parallel;
these flakes being covered with particles of a fluoropolymer from 0.1 to 0.5 µm in size.

The present invention also relates to the objects consisting of this powder. These objects may be manufactured by extruding the powder or injection moulding it in an injection moulding machine. These objects may be bipolar plates for fuel cells, supercapacitor elements and exchange surfaces in heat exchangers.

The bipolar plates thus obtained have a high surface conductivity. This powder can be used to produce plates which are highly impermeable or porous depending on the processing conditions.

DETAILED DESCRIPTION OF THE INVENTION

With regard to the graphite flakes ($G_{LP}$) with sides having dimensions from 50 to 1000 µm, it is clear that it is the width and the length of the flakes which are between 50 and 1000 µm. Advantageously, they have sides with dimensions between 50 and 500 µm and preferably between 100 and 500 µm. The particular structure of these flakes allows the conductivity property of the composite bipolar plates to be optimized because of the increase in contact area between graphitic particles. These flakes consist of elementary expanded graphite flakes with sides of 5 to 20 µm and a thickness of 0.1 to 5 µm. These flakes ($G_{LP}$) may be manufactured by the following processes:

1) Agglomeration of Graphite Flakes in a Solvent Phase:
Exfoliated graphite flakes are dispersed in an organic solvent. The graphite content in the solvent is between 10 and 50 vol % depending on the dimensional characteristics of the graphite (low degree of dilution in the case of graphites having a high specific surface area and a high degree of dilution in the case of flakes having a specific surface area of a few m²/g) in order to obtain a low-viscosity slurry. This mixture is stirred so as to obtain a homogeneous dispersion. The slurry is then dried by filtering off the solvent and then by degassing in a vacuum chamber. Advantageously, these operations may allow the solvent to be recovered. The dried paste obtained consists of coarse agglomerates of graphite flakes, the flakes being predominantly superimposed. In an agglomerate, the flakes are superimposed, joined together and their principal planes are predominantly parallel to one another. This paste is then crushed and screened so as to obtain a graphite ($G_{LP}$) powder having a particle size of between 50 µm and 1 mm.

2) Milling of Graphite Pieces:
The idea here is to obtain a graphite of the ($G_{LP}$) type, by milling solid graphitic materials. The milling is carried out in the solid or liquid phase. The powder obtained is ground to the particle size specified for the graphite ($G_{LP}$). Preferably, as raw material, graphite pieces produced by compression so as to have an anisotropic initial structure will be used.

3) Milling of Graphite Sheets:
To obtain flakes of the ($G_{LP}$) type, it is also possible to start with graphite sheets produced by calendering and/or rolling natural graphite or expanded graphite. It will be preferred to start with anisotropic graphite particles, ideally flakes. In the calendered sheets, the flakes are joined together and superimposed so as to be parallel to the surface of the graphite sheet by the mechanical rolling process.

The graphite sheets are then cut up and milled either in the solid phase or in the solvent phase. The powder obtained is crushed and screened to the dimensions specified for the graphite ($G_{LP}$).

The microcomposite powder of the invention may also include a natural or synthetic graphite (G1) of lamellar shape having a particle size of 10 µm to 600 µm, this graphite (G1) being covered with particles of a fluoropolymer from 0.1 to 0.5 µm in size. Advantageously, the size of the (G1) particles is between 10 and 150 µm.

It would not be outside the scope of the invention if the powder contained at least one other electrically conductive element covered with particles of a fluoropolymer from 0.1 to 0.5 µm in size in addition to the graphite flakes ($G_{LP}$) or in addition to the graphite flakes ($G_{LP}$) and the graphite (G1).

With regard to this other electrically conductive element, they are all electrical conductors. As examples, mention may be made of metals, metal oxides and carbon-based products. As examples of carbon-based products, mention may be made of graphite (differing from the flakes ($G_{LP}$) and the (G1)), carbon black aggregates, carbon fibres and active carbons. Carbon-based products which can be used are described in Handbook of Fillers, $2^{nd}$ Edition, published by Chem Tec Publishing, 1999, page 62, § 2.1.22, page 92, § 2.1.33 and page 184, § 2.2.2.

As regards the fluoropolymer, any polymer which has in its chain at least one monomer chosen from compounds containing a vinyl group capable of opening to polymerize and which contains, directly attached to this vinyl group, at least one fluorine atom, a fluoroalkyl group or a fluoroalkoxy group, is thus denoted.

Examples of monomers which may be mentioned include vinyl fluoride; vinylidene fluoride (VF2); trifluoroethylene (VF3); chlorotrifluoroethylene (CTFE); 1,2-difluoroethylene; tetrafluoroethylene (TFE); hexafluoropropylene (HFP); perfluoro(alkyl vinyl)ethers such as perfluoro(methyl vinyl) ether (PMVE), perfluoro(ethyl vinyl)ether (PEVE) and perfluoro(propyl vinyl)ether (PPVE); perfluoro(1,3-dioxole); perfluoro(2,2-dimethyl-1,3-dioxole) (PDD); the product of formula $CF_2=CFOCF_2CF(CF_3)OCF_2CF_2X$ in which X is $SO_2F$, $CO_2H$, $CH_2OH$, $CH_2OCN$ or $CH_2OPO_3H$; the product of formula $CF_2=CFOCF_2CF_2SO_2F$; the product of formula $F(CF_2)nCH_2OCF=CF_2$ in which n is 1, 2, 3, 4 or 5; the product of formula $R^1CH_2OCF=CF_2$ in which $R^1$ is hydrogen or $F(CF_2)z$ and z is 1, 2, 3 or 4; the product of formula $R^3OCF=CH_2$ in which $R^3$ is $F(CF_2)z$- and z is 1, 2, 3 or 4; perfluorobutylethylene (PFBE); 3,3,3-trifluoropropene and 2-trifluoromethyl-3,3,3-trifluoro-1-propene.

The fluoropolymer may be a homopolymer or a copolymer, and may also comprise non-fluoromonomers such as ethylene. The fluoropolymer is advantageously a PVDF homopolymer or copolymer containing at least 60 wt % of VF2, the optional comonomer being chosen from the fluoromonomers mentioned above and is advantageously HFP. The fluoropolymer may contain plasticizers or additives such as, for example, a well-known plasticizer—dibutyl sebacate.

The microcomposite powder may comprise, by weight, 10 to 40% of fluoropolymer per 90% to 60%, respectively, of flakes ($G_{LP}$) and, optionally, of graphite (G1) and of another electrically conductive product. Advantageously, the powder comprises 15 to 30% of fluoropolymer per 85 to 70%, respectively, of flakes ($G_{LP}$) and, optionally, of graphite (G1) and of another electrically conductive product. In the above proportions, the fluoropolymer may optionally contain plasticizers or additives.

The microcomposite powder may also contain up to five parts by weight of a pore-forming agent per 100 parts of the assembly consisting of the fluoropolymer, the flakes ($G_{LP}$) and, optionally, the graphite (G1) and another electrical conductor. As examples of a pore-forming agent, mention may be made of calcium carbonate and azobiscarbonamide.

The microcomposite powder is in the form of graphite flakes ($G_{LP}$) advantageously covered uniformly with fluoropolymer particles. Optionally, it comprises particles of graphite (G1), or particles of another electrical conductor, or particles of graphite (G1) and particles of another electrical conductor, all these particles being covered uniformly with fluoropolymer particles. The fluoropolymer particles may partly or completely cover the flakes ($G_{LP}$), the graphite (G1) and the particles of electrically conductive product.

The microcomposite powder may be manufactured by (co) atomization of one or more aqueous dispersions or emulsions containing its various constituents. For example, the microcomposite powder of the invention may be manufactured by coatomization between a fluoropolymer latex (an emulsion or a suspension) and an aqueous dispersion of flakes ($G_{LP}$) and, optionally, of (G1) and of another electrical conductor. The latex and the dispersion are introduced into the coatomization head using the standard techniques. Before coatomization, it is also possible to make a mixture by introducing the flakes ($G_{LP}$) and, optionally, the (G1) and another electrical conductor, directly into the fluoropolymer latex or else to mix a dispersion of the flakes ($G_{LP}$) and, optionally, the (G1) and another electrical conductor with the fluoropolymer latex; the process consists in spraying an aqueous dispersion (or a suspension) into a stream of hot air in order to remove the water and recover the dispersed or suspended products.

With regard to the objects consisting of this powder, all that is required is to extrude this powder at 230° C. in a corotating or counterrotating twin-screw extruder having a low-shear screw profile or by injecting it at 240° C. into an injection moulding machine with a screw having a PVC-type profile.

The bipolar plates obtained using the above microcomposite powder may have a density ranging from 500 to 3000 kg/m$^3$, a resistivity of between 0.01 and 1 Ω·cm in terms of volume resistivity within the thickness of the material and a resistivity of 0.005 to 0.5 Ω·cm in terms of the surface resistivity of the materials, measured by the four-point technique. The flexural modulus of the bipolar plates may be between 1000 and 12000 MPa and the flexural strength is between 1 and 50 MPa and advantageously between 30 and 50 MPa. The transverse thermal conductivity denotes the thermal conductivity measured through the thickness of the material; it may be between 2 and 50 W/m/K depending on the graphite content and on the degree of anisotropy. The longitudinal thermal conductivity denotes the thermal conductivity measured parallel to the surface of the material; it may be between 10 and 200 W/m/K. These properties are obtained by adjusting the proportions and the nature of the constituents.

EXAMPLES

In the following examples, graphite flakes having dimensions from 100 to 1000 μm with particles having sides of 300 μm on average are denoted by ($G_{LP}$) and a graphite having dimensions from 10 to 80 μm a side, with an average of 30 μm, is denoted by (G1).

Example 1

Dense Plaque (According to the Invention)

The starting materials were a KYNAR® 710 latex from ATOFINA, with a solids content of 25%, and a dispersion of graphite $G_{LP}$+G1 prepared according to the following procedure:

The following products were used:
KYNAR® 710, a PVDF homopolymer having an MVFR (Melt Volume Flow Rate) of 10 cm$^3$/10 min at 230° C./5 kg; a KYNAR 710 latex (solids content=20%); a carbon-containing element; the blend of graphites G1+$G_{LP}$; an antifoam (Byk 019); and a surfactant (Coadis 123K).

A dispersion of graphites G1+$G_{LP}$ was prepared by mixing water, the surfactant and the antifoam and then, after they had dissolved, the filler was added with vigorous stirring, aiming to have a high solids content (50%). The latex was then added with moderate stirring and the mixture was then completed by adding water in order to obtain a readily pumpable liquid dispersion having an SC (solids content) of 20%. The composition of a graphite dispersion is given below: 973 g of water, 0.5 g of antifoam, 129.8 g of surfactant (moderate stirring) followed by addition of 1040 g of graphite. Stir vigorously until a liquid solution which does not separate on settling is obtained. Add, with moderate stirring, 1040 g of KYNAR® 710 PVDF latex and 3475.1 g of water.

The graphite dispersion/PVDF latex mixture thus prepared was then pumped with moderate stirring and then coatomized using the following operating conditions:
Coatomizer inlet temperature: 170° C.;
Coatomizer outlet temperature: 60° C.;
Total throughput: 17 kg/h.

The coatomization, on a MINOR PRODUCTION® machine from NIRO®, of the PVDF latex particles and the graphite particles was used to prepare 1000 g of microcomposite powder with a composition of 80 wt % graphite G1+$G_{LP}$ and 20 wt % KYNAR® 710. This powder was pressed at 185° C. and at 1 t/cm$^2$ in order to produce a plaque with a density of 2050 kg/cm$^3$.

Example 2

Dense Plaque (According to the Invention)

The starting materials were a KYNAR® 710 latex from ATOFINA, with a solids content of 25%, and a dispersion of graphites $G_{LP}$+G1 prepared according to the following procedure:

The following products were used:
KYNAR® 710, a PVDF homopolymer having an MVFR (Melt Volume Flow Rate) of 10 cm$^3$/10 min at 230° C./5 kg; a KYNAR 710 latex (solids content=20%); a carbon-containing element; the blend of graphites G1+$G_{LP}$; an antifoam (Byk 019); and a surfactant (Coadis 123K).

A dispersion of graphites G1+$G_{LP}$ was prepared by mixing water, the surfactant and the antifoam and then, after they had dissolved, the filler was added with vigorous stirring, aiming to have a high solids content (50%). The latex was then added with moderate stirring and the mixture was then completed by adding water in order to obtain a readily pumpable liquid dispersion SC 20%). The composition of a graphite dispersion is given below: 973 g of water, 0.5 g of antifoam, 129.8 g of surfactant (moderate stirring) followed by addition of 1040 g of graphites. Stir vigorously until a liquid solution which does not separate on settling is obtained. Add, with moderate stirring, 780 g of KYNAR® 710 PVDF latex and 3475.1 g of water.

The graphite dispersion/PVDF latex mixture thus prepared was then pumped with moderate stirring and then coatomized using the following operating conditions:
Coatomizer inlet temperature: 170° C.;
Coatomizer outlet temperature: 60° C.;
Total throughput: 17 kg/h.

The coatomization, on a MINOR PRODUCTION® machine from NIRO®, of the PVDF latex particles and the graphite particles was used to prepare 1000 g of microcomposite powder with a composition of 87 wt % graphites G1+$G_{LP}$ and 13 wt % KYNAR® 710. This powder was pressed at 185° C. and at 1 t/cm$^2$ in order to prepare a plaque with a density of 2050 kg/cm$^3$.

Example 3

Dense Plaque (Comparative Example)

The procedure for preparing Example 1 was repeated, replacing the blend of graphites G1+$G_{LP}$ with graphite G1.

Example 4

Dense Plaque (Comparative Example)

A blend of graphites G1+$G_{LP}$ was formulated with a KYNAR® 711 PVDF powder (KYNAR® 710 in powder form having a size of between 10 and 50 μm). This blend was produced in a Turbula-type powder blender. This blending process is called dry blending hereafter. The powder recovered had a composition of 80 wt % graphites G1+$G_{LP}$ and 20 wt % PVDF. This powder was pressed at 185° C. and at 1 t/cm$^2$ in order prepare a plaque with a density of 2050 kg/cm$^3$.

Example 5

Dense Plaque (Comparative Example)

A blend of graphites G1+$G_{LP}$ was formulated with a KYNAR® 711 PVDF powder (KYNAR® 710 in powder form having a size of between 10 and 50 μm). This blend was produced in a Turbula-type powder blender. The powder recovered had a composition of 87 wt % graphites G1+$G_{LP}$ and 13 wt % PVDF. This powder was pressed at 185° C. and at 1 t/cm$^2$ in order prepare a plaque with a density of 2050 kg/cm$^3$.

The results are given in Table 1.

TABLE 1

| Material reference | Formulation process | Four-point conductivity on a plaque | Surface appearance of the plaques *** | Permeation of the plaques (m³·m/m²/Pa/s) × 7.5 × 10⁻¹⁸ | Processability in corotating twin-screw extruder * | Flexural strength | Transverse and longitudinal thermal conductivity | Rheological characterization using a capillary viscometer** |
|---|---|---|---|---|---|---|---|---|
| 80/20 (G1 + G$_{LP}$): Example 4 | Dry blending: 80 wt % G1 + G$_{LP}$ with 20 wt % KYNAR ® 711 | 50 S/cm | Uniform | 12 bar | Extrudability limit: -variable torque -rod of non-uniform appearance | | | |
| 87/13 (G1 + G$_{LP}$): Example 5 | Dry blending: ~87 wt % G1 + G$_{LP}$ ~13 wt % KYNAR ® 711 | 110 S/cm | Uniform | | Impossible to extrude | | Trans: 56 W/m K Long: 8 W/m.K | |
| 80/20 (G1 + G$_{LP}$) micro-composite Example 1 | Micro-composite: ~80 wt % G1 + G$_{LP}$ ~20 wt % KYNAR ® 710 | 50 S/cm | Uniform | 5 bar | Extrudable; 50 N.m torque; regular rod | 34.9 MPa | | 1500 N |
| 87/13 (G1 + G$_{LP}$) micro-composite: Example 2 | Micro-composite: ~87 wt % G1 + G$_{LP}$ ~13 wt % KYNAR ® 710 | 130 S/cm | Uniform | — | Extrudable; 110 N.m torque; regular rod | 31 MPa | Trans: 100 W/m.K Long: 12 W/m.k | |
| 80/20 G1 micro-composite: Example 3 | Micro-composite: ~80 wt % G1 ~20 wt % KYNAR ® 710 | 30 S/cm | Uniform | 1000 bar | Extrudable; 50 N.m torque regular rod | 29.7 MPa | | 2500 N |

*Extruder reference: RHEODRIVE 5000, L/D = 9.4 to 15, corotating twin-screw.
**Force needed to make the material flow through a 4 mm die with a constant shear rate of 0.1 s⁻¹ at 230° C.
***Macroscopic surface appearance of the plaques.

Comparison between Examples 3 and 1

Changing graphite G1 to graphite G1+G$_{LP}$ allows the surface conductivity to be increased.

Comparison between Examples 3, 2 and 1

Changing graphite G1 to graphite G1+G$_{LP}$ allows the flexural strength to be increased.

Comparison between Examples 2 and 5

Compared with the dry blend, the use of the coatomized microcomposite powder allows the transverse and longitudinal conductivity to be increased.

Comparison between Examples 2 and 5

Compared with the dry blend, the use of the coatomized microcomposite powder allows the surface conductivity to be increased.

Comparison between Examples 1, 2, 3 and 5

The use of the graphite G1+G$_{LP}$ in microcomposite powder form allows a synergy effect in terms of surface conductivity to be obtained.

Comparison between Examples 1 and 3

Changing graphite G1 to graphite G1+G$_{LP}$ allows the helium permeability to be reduced.

Comparison between Examples 1, 2, 3, 4 and 5

The use of a microcomposite powder makes it easier to extrude highly filled materials.

Comparison between Examples 1 and 3

The use of the graphite G1+G$_{LP}$ makes it easier for the melt to flow at low shear rate.

The invention claimed is:

1. Microcomposite powder comprising:
    graphite flakes (G$_{LP}$) having sides from 50 to 1000 µm and a thickness from 5 to 50 µm, consisting of agglomerates of more elementary graphite particles joined together and superimposed so that their principal planes are mutually parallel;
    said flakes being covered with particles of a fluoropolymer from 0.1 to 0.5 µm in size.
2. Powder according to claim 1, further comprising a natural or synthetic graphite (G1) of lamellar shape having a particle size of 10 μm to 600 μm, said graphite (G1) being covered with particles of a fluoropolymer from 0.1 to 0.5 μm in size.

3. Powder according to claim 2, in which the size of the (G1) particles is between 10 and 150 μm.

4. Powder according to claim 1, comprising at least one other electrically conductive element covered with particles of a fluoropolymer from 0.1 to 0.5 μm in size.

5. Powder according to claim 1, in which the fluoropolymer is a PVDF (polyvinylidene fluoride) homopolymer or copolymer containing at least 60 wt % VF2.

6. Powder according to claim 1, in which the graphite flakes ($G_{LP}$) consist of elementary expanded graphite flakes having sides from 5 to 20 μm and a thickness from 0.1 to 5 μm.

7. Powder according to claim 1, in which the proportions are, by weight, from 10 to 40% of fluoropolymer per 90 to 60%, respectively, of flakes ($G_{LP}$) and, optionally, of graphite (G1) and of another electrically conductive product.

8. Powder according to claim 7, in which the powder comprises 15 to 30% of fluoropolymer per 85 to 70%, respectively, of flakes ($G_{LP}$) and, optionally, of graphite (G1) and of another electrically conductive product.

9. Powder according to claim 1, further comprising up to five parts by weight of a pore-forming agent per 100 parts of the assembly consisting of the fluoropolymer, the flakes ($G_{LP}$) and, optionally, the graphite (G1) and another electrical conductor.

10. Objects obtained by extruding or injection moulding the powder of claim 1.

11. Objects according to claim 10 which are bipolar plates for fuel cells, supercapacitor elements or exchange surfaces in heat exchangers.

12. Process for preparing the powder of claim 1 by (co) atomization of one or more aqueous emulsions or dispersions containing various constituents.

* * * * *